United States Patent [19]

Rau

[11] 4,420,727
[45] Dec. 13, 1983

[54] SELF OSCILLATING ACOUSTIC DISPLACEMENT DETECTOR

[75] Inventor: William G. Rau, Malvern, Pa.

[73] Assignee: Burroughs Corporation, Detroit, Mich.

[21] Appl. No.: 307,484

[22] Filed: Oct. 1, 1981

[51] Int. Cl.³ .................... H01L 41/02; G01R 23/12; G01S 1/72

[52] U.S. Cl. .................................... 331/65; 310/316; 310/335; 340/686; 324/327; 328/5

[58] Field of Search ............. 331/65; 328/5; 310/316, 310/317, 318, 334, 335, 336; 340/686; 324/327

[56] References Cited

U.S. PATENT DOCUMENTS 3,379,994 4/1968 Foster ................................. 331/65
4,271,371 6/1981 Furuichi et al. .................... 310/316
4,310,807 1/1982 McKee ................................ 331/65

Primary Examiner—John S. Heyman
Attorney, Agent, or Firm—Francis A. Varallo; Edmund M. Chung; Kevin R. Peterson

[57] ABSTRACT

The present disclosure describes a system for detecting very small displacements of an object with respect to a self oscillating piezoelectric crystal by means of acoustic interference at the crystal. Acoustic energy transmitted by the oscillator is reflected by the object, and movement of the latter causes changes in the phase of the reflected energy. Such changes in turn result in variations in the amplitude of the oscillations. An electronic circuit responsive to the last mentioned variations generates output signals indicative of the instantaneous position of the object.

7 Claims, 2 Drawing Figures

SELF OSCILLATING ACOUSTIC DISPLACEMENT DETECTOR

BACKGROUND OF THE INVENTION

In scientific studies and various applications, there is a need for a device to detect very small displacements in the position of an object with respect to a reference. Some state of the art methods to accomplish the foregoing include techniques associated with piezoresistive bridges, F. M. microphones, laser interference and fiber optics. These methods differ from one another in their operating power requirements, linearity and resolution of the desired data in low signal to noise environments. Characteristically, all of these methods involve fairly high voltage and/or current for operation, making them unsuitable in applications where only very low power is available. The need exists for a displacement transducer which can operate at low power levels, that is, of the order of 100 microamperes, has high linearity over a large dynamic range and is capable of resolving displacements down to a few hundred Angstroms. The acoustic detector of the present invention meets these criteria.

SUMMARY OF THE INVENTION

In accordance with the present invention, the displacement detecting device utilizes a self oscillating piezoelectric crystal as a coherent oscillator and audio source. Moreover, the oscillator is a Q dependent receiver for its own audio component reflected by the object or member whose displacement is to be detected. As the phase of the reflected acoustic energy varies in response to the position of the member with respect to the position of the crystal, the efficiency of energy storage within the latter is varied. Thus action results in a change in the amplitude of the oscillations. The waveform envelope produced by the modulation of the oscillations is detected by electronic circuit means. The resulting signals are then amplified, corrected for voltage offsets and outputted as a DC voltage having instantaneous amplitudes indicative of the displacement of the member.

The device of the present invention is characterized by its ability to transduce the position of a member comprised of material which may be electrically conductive or nonconductive and which is placed in proximity to a simple radio crystal which also serves as a position reference. Concomitant with its displacement detection function, the device also finds application in detecting variations in pressure, temperature, and the refractive index of gases as a function of either of the latter, where the instantaneous position of a diaphragm-like member with respect to the oscillating crystal is a function of the foregoing parameters.

Other features and advantages of the present invention will become apparent in the detailed description of the invention which follows.

DESCRIPTION OF THE PREFERRED EMBODIMENT

Figure 1:
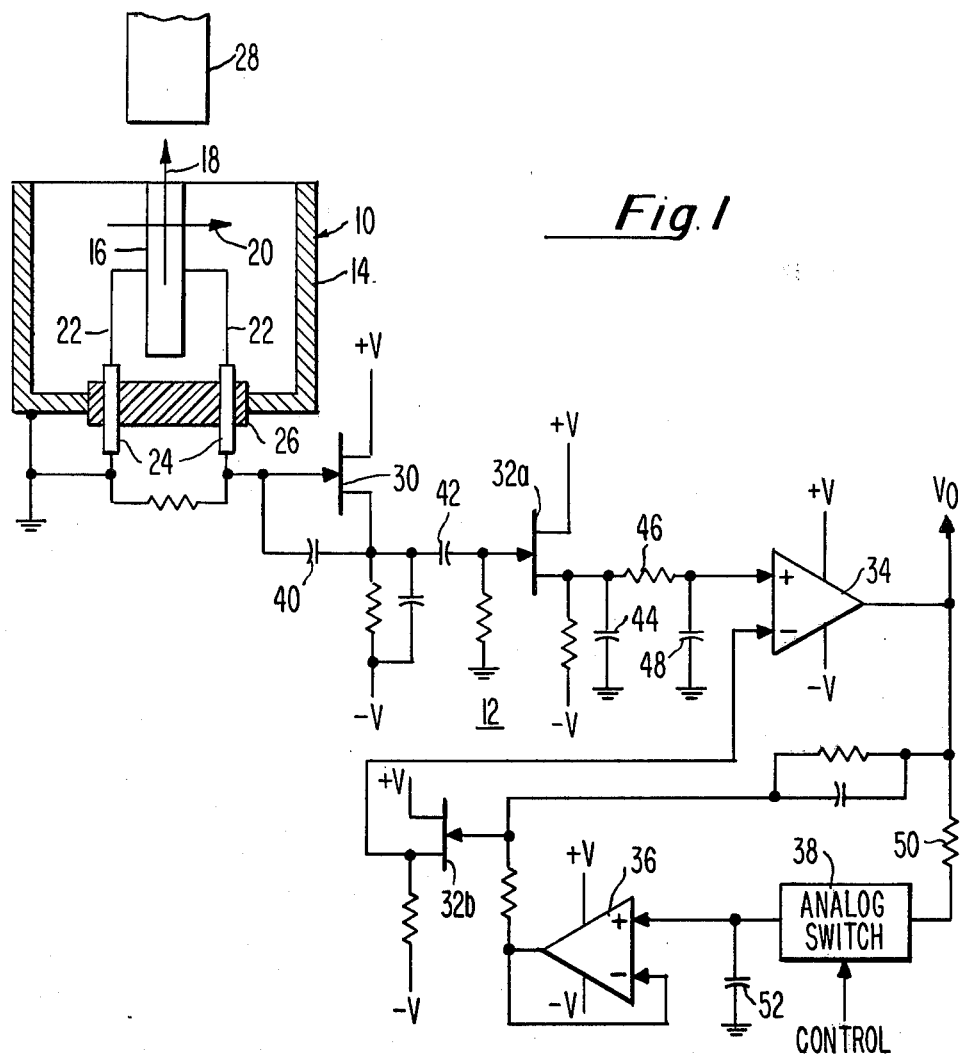
FIG. 1 is a combined pictorial representation and electrical schematic of the acoustic interference displacement detector system of the present invention.

With reference to FIG. 1, the displacement detecting system of the present invention comprises the transducer 10 and the accompanying electrical circuit 12. Transducer 10 includes a housing 14 formed of electrically conductive material which is connected to the circuit reference or ground potential. A fundamental radio frequency crystal 16 having respective orthogonal mechanical and electrical axes 18 and 20, is situated within housing 14. Mechanical support for the crystal 16 is provided by electrical conductors or wires 22. The latter also carry the signal oscillations from the crystal 16 to circuit 12 via connectors 24 placed within insulating member 26 disposed in housing 14.

An object 28 depicted diagrammatically in FIG. 1 represents the member whose displacement with respect to crystal 16 is to be monitored.

Circuit 12 comprises an N channel field effect transistor (FET) 30, a Bifet having sections 32a and 32b, a pair of CMOS or JFET input operational amplifiers 34 and 36 and an analog switch 38.

In operation, the system employs a self oscillating crystal 16 as a coherent oscillator with an air acoustic reflecting path along the mechanical or acoustic axis 18 of crystal 16. Sufficient AC coupling to implement Miller effect oscillations is provided by capacitor 40, in the highly Q dependent oscillator network which includes FET 30. Acoustic energy is transmitted from the crystal 16 and reflected by object 28 which is oriented normally to the mechanical axis 18 of the crystal. The object 28 may be formed of electrically conductive or nonconductive material and may be external to housing 14 (as shown in FIG. 1) or may be located within the housing. As the phase of the reflected acoustic energy is varied by the position of object 28, the efficiency of energy storage within crystal 16 is varied. This results in a variation of the amplitude of oscillation of crystal 16 and a consequent modulation of the AC amplitude of the electrical signal at the source electrode of the oscilator N channel FET 30. In effect the crystal oscillator circuit represents an interferometer, having the usual reference path against which the interference is to be measured, and an active path. By limiting the power dissipation in the tanking mode of the crystal through limited drive energy, the reference path may be thought of as being folded around into itself. This arrangement produces an analog device in which the crystal output may be conveniently modulated, and in which, extreme sensitivity to the displacement of an object and its reflected acoustic energy is achieved.

The oscillator signal consisting of an AC wave disposed on a DC level, appearing on the source electrode of FET 30, is coupled via capacitor 42 to the gate electrode of an N channel JFET section 32a of the Bifet. Section 32a functions as a positive edge detector and in effect exhibits substantially the properties of an "ideal" diode. That is, the variations in the amplitude of oscillations is translated by Bifet section 32a into a variation in the DC voltage of a positive envelope detected voltage. The latter appears on the source electrode of section 32a and is integrated by virtue of capacitor 44. Moreover, the high frequency AC component of the oscillator is almost eliminated from the positive envelope. A further stage of low pass filtering in resistor 46 and capacitor 48 completes the elimination of the high frequency oscillations.

Amplification of the low frequency components of the signal induced by extremely small displacements in the position of object 28 is accomplished by operational amplifier 34—the output of the low pass filter being applied to the "+" terminal of the amplifier. The DC nulling of all voltage offsets, input bias current induced voltages, and input offset current induced voltages is accomplished by a feedback loop coupling the output terminal of amplifier 34 to its "−" input terminal. Included in the feedback loop are a resistor 50 connecting the output terminal of amplifier 34 to one terminal of an analog switch 38. The other switch terminal is connected to the "+" input terminal of operational amplifier 36. The analog switch 38 responsive to control signals derived for example, from a microprocessor (not shown) provides initilization of the detector, that is, establishment of quiescent circuit conditions in minimal time. In addition, during detector operation, analog switch 38 sets the time constant for the output signal $V_O$. Thus, if little displacement activity is present, the duty cycle or ON time of the switch may be lengthened by the control signals, and the time constant increased. Conversely, in periods of high activity, short time constants are provided. A storage and hold capacitor 52 is coupled between the "+" input terminal of operational amplifier 36 and the circuit ground. The value of capacitor 52 is chosen to be sufficiently large so that the present system may be utilized as a DC coupled displacement detector with a fast level correction required every few tens of seconds.

The output of operational amplifier 36 is applied to the gate electrode of section 32b of the Bifet. The signal appearing on the source electrode of the latter section is applied to the "−" terminal of operational amplifier 34. The DC signal $V_O$ appearing on the output terminal of amplifier 34 is a function of the instantaneous position of object 28 with respect to crystal 16.

Figure 2:
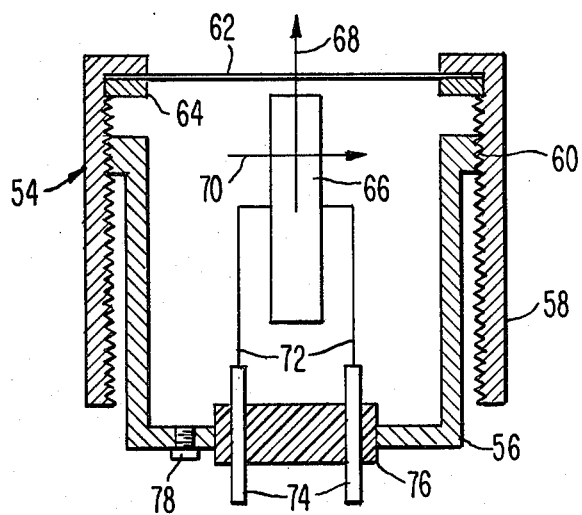
FIG. 2 is an optico-acoustic radiometer which may be utilized in the system of FIG. 1.

FIG. 2 represents in diagrammatic fashion an opticoacoustic radiometer 54. Such a radiometer operates upon the principle of thermalization of infrared radiation within an absorbing gas system. The detector system of the present invention described hereinbefore has been utilized with such a radiometer.

Briefly, the radiometer 54 of FIG. 2 is comprised of respective inner and outer electrically conductive housings 56 and 58. The relative position of the housings with respect to each other is adjustable by the mating threads 60. A diaphragm 62 functionally equivalent to the object 28 in FIG. 1 is supported at one extremity of outer housing 58 by retaining ring 64. A fundamental radio frequency crystal 66 having respective orthogonal mechanical and electrical axes 68 and 70, is situated within the housings. Mechanical support for the crystal 66 is provided by electrical conductors 72 The latter also carry the signal oscillations from the crystal 66 via connectors 74 placed within the insulating member 76 to a circuit substantially the same as circuit 12 of FIG. 1. An entry port controlled by valve 78 is provided for the admission of an infrared energy absorbing gas, such as carbon dioxide.

The diaphragm 62 represented in FIG. 2 is assumed to be transparent to both visible and infrared radiation, thereby providing the means for radiation admission within the housing and for the resolution of the level of infrared energy admitted. As the temperature of the gas within the housing increases due to an increase in the impinging radiation, the diaphragm 62 expands outward by virtue of the miniscule increase in internal pressure within the housing. This shifts the acoustic interference phase at the crystal 66 and consequently the amplitude of oscillations, in the same manner as taught hereinbefore. The peak voltage change is subsequently detected as a DC output as described in connection with circuit 12 of FIG. 1.

In an actual operative embodiment of the invention, a 184.506 Khz. Reves-Hoffman fundamental radio crystal was used. Standard ⅛ wavelength minimum to maximum amplitude variations were obtained as the position of the reflective object is passed through the ⅛ wavelength pattern. For the crystal identified above, a wavelength of 1.817 mm yielded a 1.4 volt shift in amplitude for a 0.22714 mm displacement—the reflective ¼ wavelength distance. The analog switch 38 of circuit 12 is a section of the RCA 4066. It should be understood that the foregoing components and parameters have been included solely for purposes of example and are not to be construed as limitative Finally, it should be apparent from the foregoing description of the invention and its mode of operation that there is provided an improved displacement detector. The device performs its detection function with a degree of resolution and stability suitable for a wide range of applications. Moreover, the device utilizes a minimum number of components and provides for very low power operation.

It should be understood that changes and modifications of the arrangements described herein may be required to fit particular operating requirements. These changes and modifications, in so far as they are not departures from the true scope of the invention, are intended to be covered by the following claims.

What is claimed is:

1. An acoustic displacement detector for detecting the position of an object with respect to a reference comprising:

a transducer having a housing formed of electrically conductive material coupled to a source of reference potential, a piezoelectric crystal disposed within said housing and establishing said reference, said crystal having orthogonally oriented mechanical and electrical axes, said object being positioned with respect to said crystal such that its extremity proximal to the latter lies in a plane substantially perpendicular to the mechanical axis of said crystal, an oscillator network including a current amplifying device, electrical conductor means coupling said crystal to said oscillator network for generating oscillations, the acoustic energy generated by said crystal being transmitted along said mechanical axis thereof and being reflected from said extremity of said object back to said crystal, the phase of the reflected energy being a function of the position of said object with respect to said crystal and resulting in variations in the efficiency of energy storage in the latter, the amplitude of said oscillations being dependent upon said efficiency of energy storage, and means for detecting changes in said amplitude of oscillations as indicative of a displacement in the position of said object.

2. An acoustic displacement detector as defined in claim 1 further characterized in that said current amplifying device is an N-channel FET, having a gate, a source and a drain electrode, said gate electrode being coupled to said electrical conductor means, capacitive means coupling the gate and source electrode of said FET to each other, said capacitive means having a value to implement Miller effect oscillations, the latter appearing on said source electrode.

3. An acoustic displacement detector as defined in claim 2 further characterized in that said means for detecting changes in said amplitude of oscillations includes a first N-channel Bifet section, having a gate, a source, and a drain electrode, a capacitor coupling the oscillations on said source electrode of said N-channel FET to said gate electrode of said first Bifet section, the latter functioning as a positive edge detector and translating said changes in the amplitude of oscillations into a variation in the DC voltage of a positive envelope detected voltage, the latter appearing on said source electrode of said first Bifet section.

4. An acoustic displacement detector as defined in claim 3 further including integrator means coupled to said source electrode of said first Bifet section, low pass filter means coupled to said integrator means, and a first operational amplifier having a positive and a negative input terminal and an output terminal, the output signals from said low pass filter means being applied to the positive terminal of said first operational amplifier.

5. An acoustic displacement detector as defined in claim 4 further including a feedback circuit connecting the output terminal of said first operational amplifier to the negative terminal of the latter, said feedback circuit comprising an analog switch having a pair of terminals, resistive means coupling one terminal of said switch to said output terminal of said first operational amplifier, a second operational amplifier having a positive and a negative input terminal and an output terminal, the other terminal of said switch being coupled to the positive terminal of said second operational amplifier, a sample and hold capacitor coupled between said last mentioned terminal and said reference potential, said negative input terminal and said output terminal of said second operational amplifier being coupled to each other, a second N-channel Bifet section having a gate, a source and a drain electrode, resistive means coupling the output terminal of said second operational amplifier to said gate electrode of said second Bifet section, and means coupling the source electrode of said last mentioned section to said negative input terminal of said first operational amplifier, the output signal of said detector appearing on the output terminal of said first operational amplifier.

6. An acoustic displacement detector as defined in claim 5 wherein said electrical conductor means includes a pair of wires, each wire having an extremity coupled to said crystal, a pair of connectors disposed in an insulative member in a wall of said housing, said connectors being coupled respectively to the opposite extremities of said pair of wires, one of said connectors being coupled to the gate electrode of said N-channel FET and the other of said connectors being coupled to said reference potential.

7. An acoustic displacement detector as defined in claim 6 wherein said piezoelectric crystal is of the fundamental radio type.

* * * * *